July 10, 1962 L. H. JOHANSEN 3,043,481
DISPENSING CONTAINERS FOR GRANULAR SUBSTANCES
Filed Oct. 20, 1958
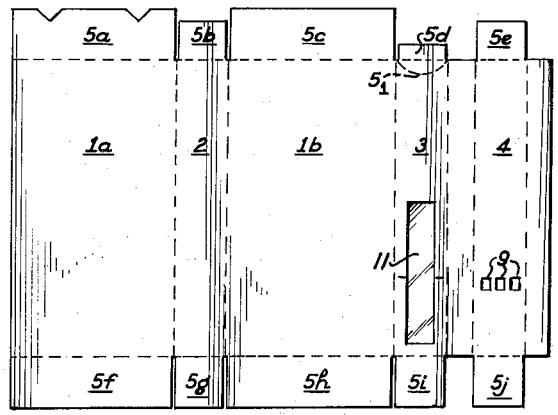
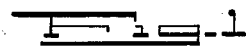
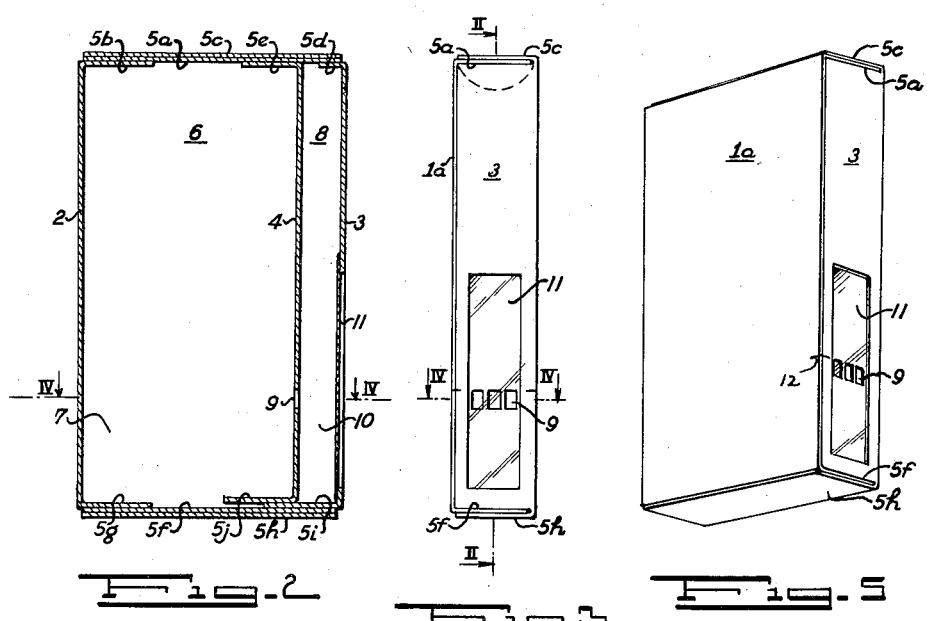
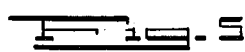
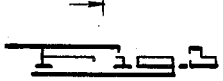
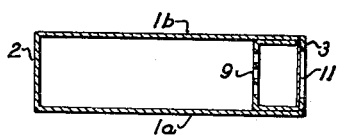
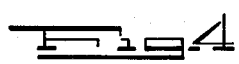
INVENTOR
LIEF HARTVIG JOHANSEN

United States Patent Office 3,043,481
Patented July 10, 1962

3,043,481
DISPENSING CONTAINERS FOR GRANULAR SUBSTANCES
Leif Hartvig Johansen, Dybwadsgate 3, Oslo, Norway
Filed Oct. 20, 1958, Ser. No. 768,242
Claims priority, application Norway Oct. 19, 1957
1 Claim. (Cl. 222—158)

This invention relates to dispensers and more particularly to a package or container which is provided with means for controlling the amounts of substance to be dispensed from the container, and which is adapted for use with granular, powdered or flake soap or other such substances such as, for instance, granular drugs and the like.

A container, of the kind to which the invention relates, consists of cardboard or other such material, and at one end the container is provided with weakening lines enabling a part of the end wall to be torn off in order to form a discharge opening for the granular contents.

Such a container is adapted to be manipulated with one hand while held in said hand for dispensing desired quantities of substance from the container by tilting or inversion of the same.

An object of the invention is to provide a container of the above nature enabling the measuring of desired amounts of granular substance to be effected in an easily controllable manner.

According to the invention, one or more windows are provided in the container wall for enabling the quantity of granular substance in the container to be controlled visually, and one or more suitable marks or the like, for instance arranged as scales, are provided on the outer side of the container alongside the windows for enabling the contents of the container to be controlled exactly.

Said container may be provided with an inner channel disposed along one of the side walls throughout the entire length of the same and divided from the main space of the container by means of a plane partition wall. Said main space and the channel are interconnected through one or more openings, and according to the invention said openings are provided at a distance from that end of the container not having a discharge opening, said distance corresponding to the quantity to be measured.

According to a further feature of the invention a window is placed in the wall of the measuring channel in such a position that the granular substance in the measuring chamber proper easily can be observed.

The above and other features of the invention will appear more clearly from the following detailed description when taken in connection with the accompanying drawing which shows a preferred embodiment of the inventive idea.

In the drawing:

FIGURE 1 is a plan view of a cardboard blank from which a container with a measuring channel can be formed by folding;

FIGURE 2 is a vertical longitudinal sectional view through the container when folded and glued together, the view being taken along lines II—II of FIGURE 3;

FIGURE 3 is an edge view of the container;

FIGURE 4 is a horizontal sectional view on line IV—IV in FIGURE 2; and

FIGURE 5 is a perspective view of the container.

The measuring container is made from a single cardboard blank, which is punched to the shape shown in FIGURE 1 so that wide wall sections 1a and b, narrow edge wall sections 2 and 3 and a narrow partition wall section 4 are formed. Also, end wall sections 5a–j are formed. Said sections are separated from each other by means of the dotted weakening lines. By means of automatic machines the sections are folded together along the weakening lines and interconnected by gluing, so that a container of the shape shown in FIGURE 2–5 is formed.

The partition wall 4 separates the main enclosure 6 of the container, forming the storage room for the granular substance 7, from the measuring channel 8, the length of which equals the entire length of the container. The discharge of the measured portions into the measuring channel 8 takes place through a discharge opening made by exerting an inwardly directed pressure on a tongue $5_1$ defined at one end of the wall 3 by means of a curved weakening line, so that the part of the end wall covering the end of the channel 8 can easily be torn off. In the drawing, FIGURES 2, 3 and 5 show the container placed in normal erect position and having the discharge opening tongue $5_1$ at its upper end.

In the partition wall 4 at a predetermined distance from the lower end of the container, one or more openings 9 are provided, through which granular substance flows from the main space 6 into the lower part of the channel 8 when the container is placed in erect position as shown. Thereby a predetermined quantity of substance 10 will flow into the channel, said quantity being determined by the height of the openings 9 above the bottom of the container, as the substance closes the openings after having reached the upper edge of the same.

The container is provided with one or more windows enabling the quantity of granular substance in the container to be controlled visually. The windows may be of plastic or another suitable material. According to the embodiment shown, a window 11 is mounted in the narrow side wall 3 in such a position that the part of the measuring channel corresponding to the quantity to be measured can be readily observed. One or more windows may also be provided in one or both wide side walls for the purpose of controlling the substance contents of the main space 6. Said windows may suitably be provided throughout almost the entire height of the container. For the purpose of reinforcing the container when long windows are used a suitable number of transverse narrow ribs formed by the container material interconnect the wall parts on both sides of the window.

In order to enable the contents of the container and the measured quantities 10 to be controlled exactly, one or more dashes or the like 12 are provided on the outer surface of the container beside the windows, said dashes for instance forming scales.

The measuring container as above described is used in the following manner:

If the level of the granular substance in the channel 8 when the container is received is above the level of the dashes 12, the container is to be held in a horizontal position with the window facing upwards and shaken, whereby the substance will flow back into the storage space 6 through the openings 9. When thereafter the container is placed in a vertical position, the substances will flow into the channel 8 until it substantially levels with the dashes 12. Then the container is opened by pressing the tongue $5_1$ inwardly and tearing the same loose together with a part of the upper end wall. By quickly tilting the container approximately 180 degrees, the measured quantity 10 is discharged through the discharge opening, which now is situated at the lower end of the container. When the container is again placed on a table or the like in the position shown in FIGURE 2 with the discharge opening at the upper end, a further quantity of granular substance will flow into the measuring channel. Thus the container will always be ready for use with a measured quantity in said channel as long as a sufficient quantity of substance remains in the container. When said quantity has been reduced so much that it cannot itself regulate the quantity to be measured, it is possible to assist in filling the measuring portion of the channel by keeping the container in an inclined position thereby to allow the substance to flow into the measuring chamber. Thereafter the container is shaken until the substance levels with the dashes 12.

By means of the system described, exactly measured quantities of granular substance can be easily obtained, said quantities being dependent on the distance of the openings 9 from the lower end of the container.

The container also may be discharged continuously. In this case the container is being kept in an inclined position with the narrow wall having a window facing downwards. The contents then will flow continuously into the measuring channel and therefrom out through the discharge opening until the container is erected to a vertical position. If only a small quantity remains, the container may be shaken until it is entirely empty.

It will be apparent to those skilled in the art that my present invention is not limited to the specific details described above and shown in the drawing, and that various further modifications are possible in carrying out the features of the invention without departing from the spirit and scope of the appended claim.

What I claim is:

Apparatus for dispensing predetermined quantities of material, said apparatus comprising a package having a top and bottom and defining an enclosure adapted for containing said material, said package including side and end walls and double top and bottom walls, a planar vertical partition extending from said top wall to said bottom wall in said enclosure to divide the same into isolated chambers, said partition being in entirety uniformly spaced from one of said end walls, one of said chambers constituting a main space for enclosing the material therein, the other chamber constituting a measuring and dispensing chamber, said partition having at least one opening substantially closer to the bottom wall than to the top wall and providing communication between said main chamber and said measuring chamber, the opening permitting a predetermined quantity of material to flow from the main chamber to the measuring chamber with the package upright, the predetermined quantity of material being enclosed in the measuring chamber to the level of said opening, said one end wall being provided with an opening exposing said measuring chamber adjacent the opening in said partition, a transparent member covering said opening in the end wall, said package being provided with an opening at the top thereof in communication with said measuring chamber to enable discharge of said predetermined quantity therefrom, top and bottom flaps on said partition connected in face-to-face relation with said top and bottom walls respectively within said main space for bracing said partition, and top and bottom flaps on said one end wall connected in face-to-face relation with said top and bottom walls respectively, the top flap on said one end wall terminating substantially at said partition.

References Cited in the file of this patent

UNITED STATES PATENTS

| 1,263,751 | Elkins | Apr. 23, 1918 |
| 2,153,911 | Benedetti | Apr. 11, 1939 |
| 2,750,082 | Kowal | June 12, 1956 |
| 2,819,000 | Boguss et al. | Jan. 7, 1958 |

FOREIGN PATENTS

| 739,194 | Great Britain | Oct. 26, 1955 |